Figure 1:
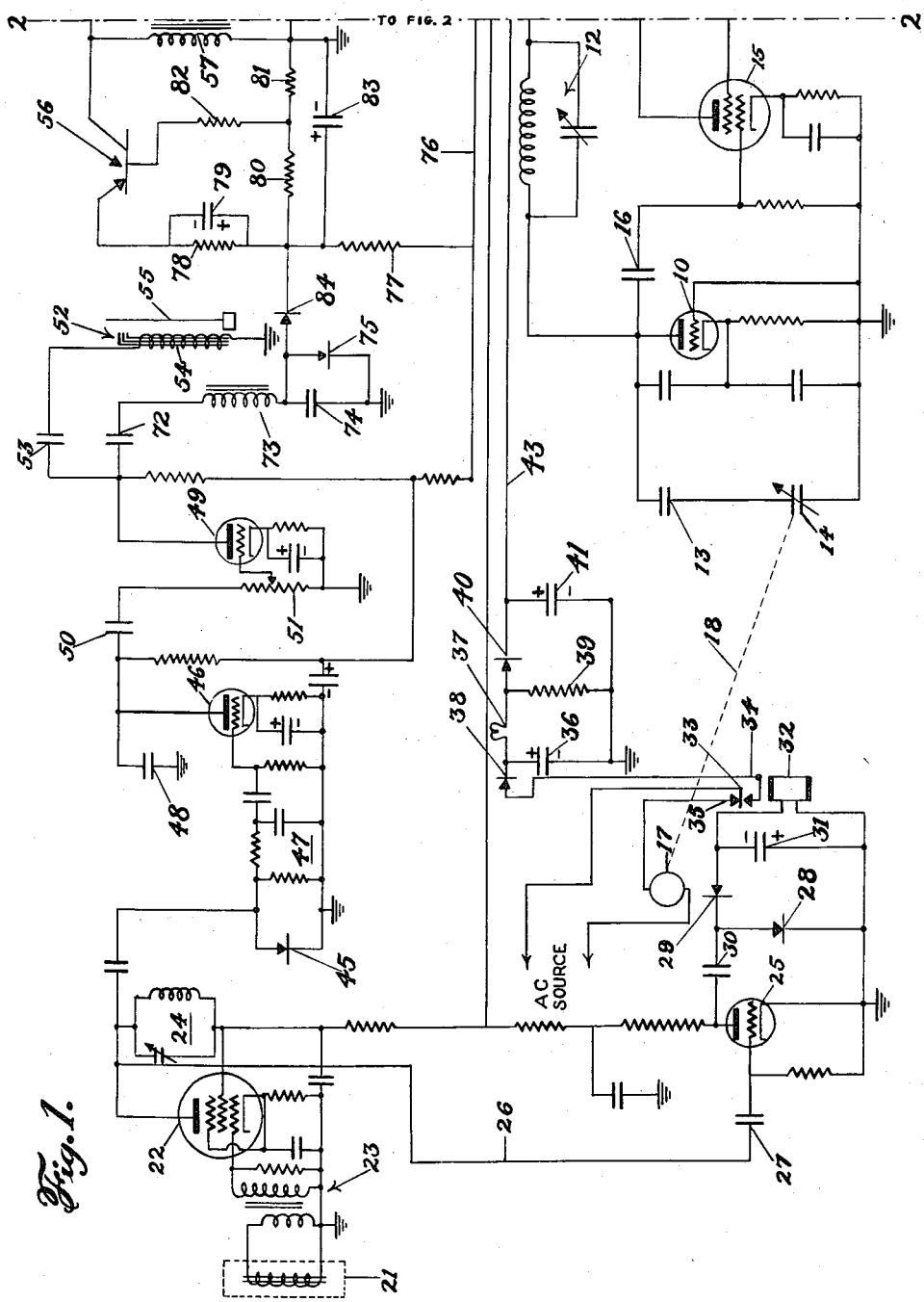

United States Patent Office 2,972,133
Patented Feb. 14, 1961

2,972,133
APPARATUS FOR DETECTING MOTION
Leslie A. MacDonald, New Hyde Park, N.Y., assignor to American District Telegraph Company, Jersey City, N.J., a corporation of New Jersey Filed Sept. 28, 1956, Ser. No. 612,776
24 Claims. (Cl. 340—258)

The present invention relates to a method and apparatus for detecting motion and more particularly to a method for establishing a field of radiant energy in a given space and detecting motion in said space by detecting the disturbances in said radiant energy field caused by said motion, as well as apparatus for carrying out the same.

This application is a continuation-in-part of application Serial No. 416,350, filed March 15, 1954, now Patent 2,769,972.

Various systems have been proposed for the detection of motion by utilizing the effect of said motion on radiant energy. In accordance with one such system, an enclosure is flooded with radiant energy so as to establish a standing wave pattern therein. Theoretically, a transmitter and receiver are so located relative one to the other than the receiver is normally located at a node of the standing wave pattern. Such a system, which is exemplified, for example, by Miessner Patent 2,071,933, issued February 23, 1937, may be termed a null system for ready identification, since in the absence of a disturbance to the standing wave pattern no energy is taken from the field by the receiver. The null system takes advantage of the fact that a disturbance of the standing wave pattern as by movement of a radiant energy reflector will cause a rearrangement of the pattern so that the receiver is no longer at a node, or other constant energy level, and may therefore take energy from the field which may be amplified and fed through a circuit for initiating a desired sequence of events. However, the null system has thus far proven unsatisfactory since in practice it is virtually impossible to establish the conditions necessary to maintain a stable radiant energy standing wave pattern even in a completely enclosed area. This will be readily understood when it is appreciated that either the transmitter or the receiver or both may drift frequencywise so that, with the receiver at a null point for a given frequency or wave length, frequency drift may often result in such a readjustment of the standing wave pattern that the receiver is no longer located at a node. Other disturbances not intended to be detected may also cause a redistribution of the standing wave pattern. These include variations in the atmosphere of the enclosure such as humidity and density changes. Very often the standing wave pattern is disturbed by convection currents in the atmosphere due to a temperature differential between different points as may result from a heat radiator or the like.

It has also been proposed to provide a system which for convenience may be designated as the frequency shift system. In accordance with the frequency shift system, which is exemplified, for example, by Bagno Patent 2,655,645, issued October 13, 1953, an enclosed area is also flooded with radiant energy at a predetermined frequency. A receiver is located in the enclosure to receive, detect and compare the frequencies received. If the frequencies received are the same as that transmitted, then that is indicative of no motion or movement in the enclosed area. On the other hand, if a different frequency from that transmitted is received, then a circuit is actuated to initiate a desired train of events. Here, advantage is taken of the well known Doppler effect, in that objects or things in the path of the energy radiated by the transmitter give rise to reflections which ultimately arrive at the receiver and motion of any one of these reflectors relative to the receiver causes a frequency shift corresponding to the direction and speed of movement. The amplitude or energy level of the new frequency at the receiver will be proportional to the efficiency of the moving thing or object as a reflector of the radiant energy. It will be apparent that, while in the null system the receiver should always be located at a node of the standing wave pattern, just the opposite condition is desirable to satisfactory operation of the frequency shift system provided the latter is supervised continuously, i.e., means are provided to cause an alarm upon a drop in the received signal intensity below a predetermined level. In other words, a highly desired attribute of the latter system is that the receiver never be located at a node of the radiant energy so that a drop in radiant energy or received signal strength can be used as an indication of equipment failure. Thus, the efficiency or dependability of a frequency shift system may be evaluated from one aspect in terms of the occurrence of a null point or node at the receiver versus the duration of the period of operation. The importance of avoiding the occurrence of a null point at the receiver may, perhaps, be best brought out by a brief consideration now of one type of installation which may be utilized. A suitable transmitter and receiver may be installed in an area for the detection of motion therein which may be that of an intruder. Movement of the intruder will cause a different frequency to be received at the receiver than that generated by the transmitter. The receiver is usually coupled to an alarm circuit in such fashion that the presence of the intruder is signalled at some remote central station. Of course, a breakdown in the equipment would prevent detection of the intruder and it is therefore necessary that such a failure also give rise to a signal at the central station, which of necessity must be considered as an alarm condition until an investigation is made. Since the occurrence of a null point at the receiver would prevent detection, the apparatus is so designed that such an occurrence also triggers the alarm circuit thereby necessitating investigation from the central station. However, supervision of this character would give rise to an undue number of false alarms if means were not provided to suppress the formation of null points at the receiver.

Various attempts have been made to prevent the occurrence of a null point at the receiver. For example, it has been proposed to link the receiver and transmitter in an oscillatory system which includes the air in the enclosure in which the apparatus is installed so that the frequency transmitted is dependent upon the condition of the air in the space as well as the transmitting and receiving apparatus. It has also been proposed to utilize more than one transmitter, such as two transmitters operating with a fixed frequency difference between them, so as to avoid the occurrence of a null at the receiver. In practice, such arrangements have not only failed to reduce the occurrence of spurious signals, but have actually increased the incidence thereof thereby rendering the systems highly unsatisfactory in operation.

Another condition which tends to cause an undue incidence of false alarms, particularly where the radiant energy is of a sonic or ultrasonic character, is the presence of air turbulence within the protected space. Such turbulence may arise from a variety of sources, for example, wind, radiators and blower heaters. A turbulent condition within the protected space will produce modulation of the received radiant energy. The modulation will be primarily at a very low frequency, e.g., 10 cycles per second, although higher frequencies in the order of those produced by an intruder will generally be present.

In accordance with the foregoing, a principal object of the invention has been to provide a novel and improved method and apparatus for detecting motion by means of which spurious signals are avoided to an enhanced degree.

A more specific object of the invention has been to provide such a method and apparatus in which the frequency developed by the oscillator of the transmitter is varied in predetermined relation to the received signal strength.

Another specific object of the invention has been the provision of such a method and apparatus in which modulation components caused by turbulence are to a large degree suppressed.

Another object of the invention has been the provision of a novel and improved high Q reed type filter.

A feature of the invention has been the provision of means operative in response to a drop in received signal strength below a predetermined level continuously to vary the transmitted frequency until the received signal strength exceeds such predetermined level or until a predetermined time interval has elapsed, at which time an alarm will be given.

Another feature of the invention has been the provision of means responsive to the presence of low frequency modulation components due to turbulence to reduce the receiver sensitivity so that higher frequency modulation components caused by turbulence will not create an alarm condition.

Figure 2:
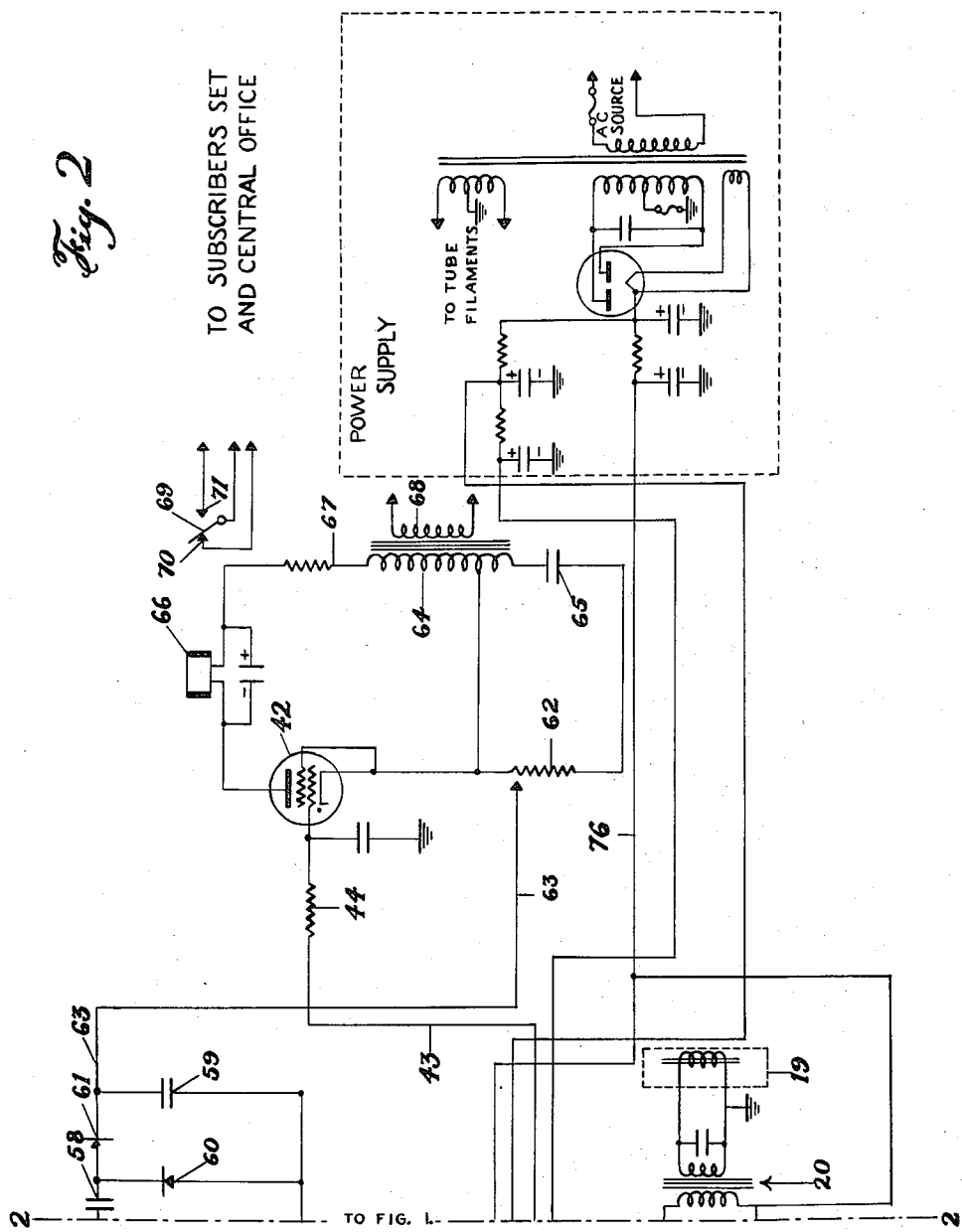
Figure 3:
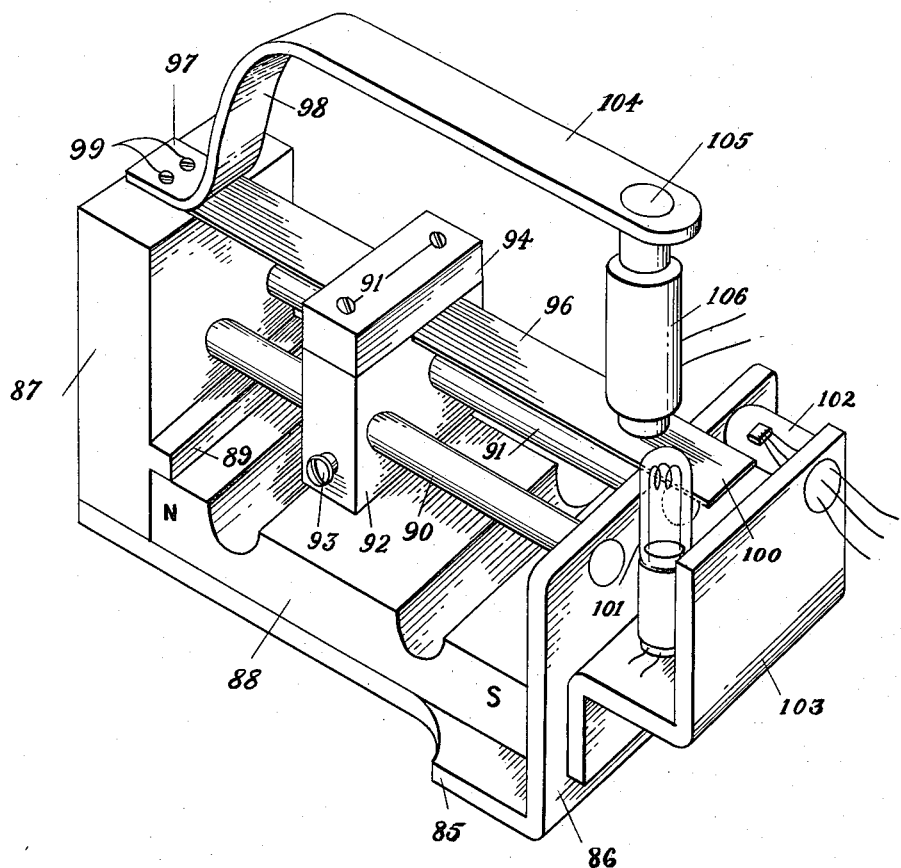

Other and further objects, features and advantages of the invention will appear more fully from the following description, taken in connection with the appended drawings, in which:

Figs. 1 and 2, when joined along the lines 2—2, show a schematic wiring diagram of a motion detection system constructed in accordance with the invention; and Fig. 3 illustrates a reed type filter constructed in accordance with the invention.

Referring now to the drawings, a triode tube 10 is connected in a modified Colpitts type oscillator circuit. The anode of tube 10 is coupled to a source of positive potential in power supply 11 through tuned circuit 12. Series connected fixed capacitor 13 and variable capacitor 14 are effectively in parallel with the circuit 12, so that varying the setting of capacitor 14 will vary the oscillator output frequency which is applied to the grid of a triode tube 15 through a coupling capacitor 16. Capacitor 14 is mechanically coupled to an electric motor 17 through a suitable shaft, linkage or gearing 18. The capacity of capacitor 14 may be varied continuously between a minimum and maximum by rotation of motor 17. Thus the oscillator output frequency may be varied continuously over a selected range upon energization of motor 17. The extent of this range is dependent on the maximum and minimum values of capacitor 14 as well as by the other oscillator circuit constants. In one embodiment of the invention, the nominal oscillator frequency was 20,700 cycles, but the actual frequency could be varied between 20,800 cycles and 20,600 cycles by operation of motor 17. The nominal oscillator frequency and the range of variation can, of course, be selected to fit particular conditions, and the values mentioned are given only by way of example.

Tube 15 serves as a power amplifier for the oscillatory energy delivery by tube 10. The output of tube 15 is delivered to a transmitting transducer 19 through a transformer 20. The transmitting transducer 19, as well as a receiving transducer 21, may be of any suitable type for the conversion of alternating current into ultrasonic radiant energy, but are preferably constructed in accordance with the teachings of MacDonald and Kelly Patent 2,715,191, granted August 9, 1955, or Kelly Patent 2,715,192, granted August 9, 1955. The transducers 19 and 21 should be constructed so that they transform energy efficiently through the range of frequencies at which oscillator 10 may be operated. The transducers 19 and 21 are preferably widely separated in the protected space and may be located remotely from their associated transmitting and receiving circuits.

Sound energy transmitted by the transducer 19 enters the area to be protected. Some of this energy may pass directly to the receiving transducer 21 but most, if not all, of the transmitted energy picked up by the receiving transducer 21 will be reflected from objects within the area or from the walls of the area. There will be a tendency for standing wave patterns to be set up within the area and, because of thermal disturbances, air currents and the like, the standing wave pattern will tend to shift and the energy received by the receiving transducer will tend to vary slowly with time. However, so long as the shifts in the standing wave pattern are relatively slow, the energy received by the receiving transducer 21 will virtually all be at the frequency of the transmitting transducer 19. In accordance with the well known Doppler effect, when an object within the protected area moves with appreciable velocity, or when substantial air currents are set up in the area, the energy impinging on the receiving transducer 21 will have a frequency component differing from the transmitted frequency by an amount dependent upon the character of the motion or disturbance. Generally, the more rapid the motion the greater will be the frequency difference between the transmitted frequency and the shifted frequency component received. The effect of the presence of a shifted frequency component in the received energy is to provide a modulated signal at the receiver. The received energy will then resemble a carrier wave at the transmitter frequency modulated at a relatively slow rate as a result of the Doppler shift. The modulating frequency, depending on the character of the motion, may vary from a few cycles per second to a hundred cycles per second, or more.

The receiving transducer 21 functions to convert received sound energy into an alternating current having a frequency equal to the received frequency and an amplitude proportional to the amplitude of the received energy. The alternating current produced by the receiving transducer 21 will have more than one frequency component when the received signal is composed of more than one frequency, i.e., when it is modulated. This will occur when motion of an object or of an air current in the protected area causes a Doppler shift in frequency.

The alternating current output of receiving transducer 21 is applied to the grid of a pentode amplifier tube 22 through a suitable transformer 23. The amplified output of tube 22 is developed across a parallel resonant circuit 24 which intercouples the anode of tube 22 and a source of positive potential in power supply 11. Circuit 24 is preferably broadly tuned to the transmitted frequency, thus eliminating response at extraneous resonant peaks of the receiving transducer A portion of the amplified output of tube 22 is applied to the grid of a triode tube 25 through a conductor 26 and a coupling capacitor 27. The amplified output of tube 25 is rectified in a half wave voltage doubler circuit comprising rectifiers 28 and 29 and capacitors 30 and 31. The D.C. voltage appearing across capacitor 31 is used to hold up a relay 32 whose coil is connected across capacitor 31. Should the input drop off below a predetermined point, as when a null point of the standing wave pattern commences to form at receiving transducer 21, relay 32 will become deenergized. For this purpose, relay 32 should be adjusted so as to drop out when the voltage applied to its coil drops below a value corresponding to the predetermined input signal level.

When relay 32 drops out, armature 33 thereof leaves front contact 34 and makes with back contact 35, applying power from an A.C. source (which might be the usual 6.3 volt filament winding of the power supply transformer) to motor 17, causing the latter to rotate. As explained previously, motor 17, when energized, varies the capacity of capacitor 14 and thus varies the output frequency of oscillator 10. Motor 17 is preferably arranged to vary the capacity of capacitor 14 at a slow rate, preferably 1 complete cycle of capacity variation in a selected interval, e.g., one minute. As soon as the oscillator frequency starts to change, the standing wave pattern of the radiant energy in the protected space will start to change. Generally a very small frequency change will cause a sufficient change in the standing wave pattern so that the null point causing the drop in input signal strength will move away from the transducer 21, causing an increase in this received signal strength. As soon as the received signal strength reaches the predetermined value, relay 32 will pick up, causing armature 33 thereof to make with front contact 34, removing power from motor 17 and preventing any further shift in oscillator frequency.

Contact 34 is coupled to one side of a capacitor 36 and to one terminal of a lamp filament 37 through a rectifier 38. The other side of capacitor 36 is connected to ground. The other terminal of lamp filament 37 is connected to one end of a resistor 39 and to one side of a rectifier 40. The other end of resistor 39 is connected to ground. The other side of rectifier 40 is connected to one side of a capacitor 41, the other side of which is connected to ground. While relay 32 is energized, which is the normal circuit condition, a charge is built up across capacitor 41 through rectifiers 38 and 40. For example, if the A.C. potential between contact 34 and ground is 3 volts, the D.C. potential across capacitor 41 may stabilize at about 2 volts. When relay 32 drops out, as described, power is removed from contact 34 and the charge on capacitor 41 decays through the back resistance of rectifier 40. The decay period for this charge, which is determined by the time constant of the discharging circuit (principally capacitor 41, rectifier 40 and resistor 39), is preferably selected to be equal to the time required for motor 17 to operate capacitor 14 through one complete cycle of capacity variation, e.g., one minute.

The high side of capacitor 41 is coupled to the control grid of a thyratron or other suitable gas discharge tube 42 through a conductor 43 and a resistor 44. As will be explained subsequently, a non-conductive condition of thyratron 42 results in an alarm signal transmission. The positive bias supplied to the control grid of thyratron 42 from the high side of capacitor 41 is normally sufficient to maintain thyratron 42 conductive. When this bias is lost due to decay of the charge on capacitor 41, thyratron 42 will become non-conductive, resulting in transmission of an alarm. Thus, when relay 32 drops out, there is a selected time interval, e.g., one minute, in which variation in capacitor 14 can result in transmission of a new frequency at which the received signal strength is sufficient to pick up relay 32. If a suitable new frequency is not found by the end of this selected time interval, so that relay 32 remains de-energized, decay of the charge on capacitor 41 will cause thyratron 42 to become non-conductive, resulting in transmission of an alarm.

The signal output of amplifier tube 22 is also applied to a detector 45, which may be a diode or other suitable rectifying element. The rectified output of detector 45 is applied to the grid of a triode amplifier tube 46 through a low pass RC filter 47. The filter 47 is intended to prevent the carrier frequency from being impressed on the input of tube 46. Should any carrier remain after filter 47, it will be by-passed to ground through a capacitor 48 in the anode circuit of tube 46. By virtue of detector 45 and low pass filter 47, the input to amplifier 46 will be the modulating frequency components, if any, of the received radiant energy. Under static conditions, there will be little or no modulation of the received radiant energy. In the presence of a moving intruder, or in the presence of air turbulence in the protected space, modulation components will be present and will be amplified by amplifier 46. The signal output of amplifier 46, if any, is applied to the input of a further amplifier stage, comprising a triode tube 49, through a coupling capacitor 50 and a potentiometer 51. Potentiometer 51 may be used as a gain control potentiometer for adjusting system sensitivity.

The amplified output of tube 49 will contain the modulating frequencies present in the radiant energy received by transducer 21. In an ultrasonic system, it has been found that a large proportion of the modulation caused by a moving intruder will be in the neighborhood of 35 cycles per second, although modulation frequencies over a relatively wide range will be present. Usual air turbulence, on the other hand, will result primarily in very low modulation frequencies, generally of the order of 10 cycles per second.

The amplified output of tube 49 can be rectified and used to produce an alarm. However, in order to reduce the incidence of spurious alarms, this output should be filtered to eliminate or greatly suppress frequency components resulting from sources other than those representing a true alarm condition. In accordance with one aspect of the invention, the output of tube 49 is applied to the coil of a very high Q reed type filter 52 through a coupling capacitor 53. Filter 52 should be tuned to the principal modulation frequency associated with an alarm condition, e.g., 35 cycles per second.

Filter 52 is preferably constructed in accordance with Fig. 3, which is described in detail hereinafter. This filter comprises a coil 54, a reed 55, the light source 37 and a phototransistor 56. The coil 54 is connected to the output of tube 49 and is arranged to vibrate the reed 55. The reed 55 is tuned to vibrate with maximum amplitude at the desired filter frequency, e.g., 35 cycles per second. The reed 55 is arranged in the path of light between the light source 37 and emitter of phototransistor 56, so that vibration of reed 55 will result in modulation of this light. The modulated light hitting the emitter of phototransistor 56 causes pulses of double frequency current (double the reed vibration frequency) to flow in the collector of the phototransistor 56. These pulses have a steep wave front and will develop a substantial voltage across an inductive load connected across the output of the phototransistor. This load may be a choke coil 57 which might have an inductance of, for example, 200 henries. A mechanical filter, of the type described, is desirable at the low frequencies involved in such a circuit because of its inherent high Q at these frequencies.

The voltage developed across coil 57 is applied to a voltage doubler circuit comprising capacitors 58 and 59 and rectifiers 60 and 61. A typical rectified voltage across capacitor 59 might be, for example, of the order of 6 volts. This voltage is applied to the slider of a potentiometer 62 through a conductor 63.

The cathode of thyratron 42 is connected to an intermediate tap of a transformer secondary winding 64 and, through potentiometer 62 and a capacitor 65, to one end of the winding 64. The other end of the winding 64 is coupled to the anode of thyratron 42 through an alarm relay 66 and a resistor 67. Primary winding 68 may be coupled to a suitable A.C. source such as the tube filament winding of power supply 11.

The potentials applied to the thyratron anode and cathode from winding 64 are adjusted in magnitude and phase so as to maintain thyratron 42 conductive, with the help of the bias voltage applied to the thyratron grid through conductor 43. A positive potential applied to the slider of potentiometer 62 through conductor 63 will override the bias and A.C. voltages applied to the thyratron and cause the latter to cease conduction. The actual value of positive voltage between the slider of potentiometer 62 and ground which will cause thyratron 42 to cease conduction may be selected as desired. However, the value should not be too low since a D.C. potential may be produced in the absence of a true alarm, although these voltages will not be so high as those resulting from a true alarm.

De-energization of relay 66 will cause armature 69 thereof to leave front contact 70 and make with back contact 71. This change may be used to transmit an alarm to a remote central station, energize a local alarm, or otherwise signal an alarm condition in any well known manner. An alarm signal may be given as the result of a modulation component creating a sufficient D.C. potential at the slider of potentiometer 62 or as the result of de-energization of relay 32 for a sufficient time so that the bias voltage at the control grid of thyratron 42 decays to a sufficient value. Either condition will cause thyratron 42 and thus alarm relay 66 to become de-energized.

A turbulent condition in the protected space will produce a modulation envelope at receiving transducer 21 (and in the output of tube 22) which contains very low frequencies, of the order of 10 cycles per second, along with other higher frequencies some of which will ordinarily be in the vicinity of the reed frequency, i.e., the frequency to which the reed filter is tuned and which corresponds to the frequency or a frequency within a range characteristic of the modulation produced by an intruder moving within the protected space. As will be explained, the very low frequencies characteristic of air turbulence may be used to reduce the system sensitivity, particularly with respect to these low frequencies, and thus to reduce the likelihood of spurious alarms. For this purpose, the anode of tube 49 is coupled to ground through a series circuit comprising a capacitor 72, an inductor 73 and a capacitor 74. Inductor 73, which might have, for example, an inductance of 500 henries, a capacitor 74, which might have, for example, a capacity of one microfarad, form a low pass filter adapted to reject frequencies as high as the reed frequency. The low frequencies, e.g., 10 cycles per second, derived from the anode of tube 49 develop a voltage across capacitor 74. This voltage is rectified by a rectifier 75 connected in parallel with capacitor 74. Rectifier 75 might be, for example, a diode. The rectified voltage delivered by rectifier 75 might be of the order of three to five volts, in a typical circuit.

Phototransistor 56 is supplied with positive voltage from power supply 11 through a conductor 76 and a resistor 77. Resistor 77 is coupled to the phototransistor emitter electrode through a parallel connected resistor 78 and capacitor 79. A voltage divider formed by resistors 80 and 81 which are coupled between resistor 77 and ground supply power to the base electrode through a resistor 82. Resistor 77 is also coupled to ground through a relatively large capacitor, e.g., 50 microfarads, 83. A rectifier 84, which is preferably a silicon junction diode with a suitable zener breakdown voltage, interconnects rectifier 75 and resistor 77.

Rectifier 75 is poled so that negative peaks of voltage are applied to rectifier 84. The negative peaks of voltage are effectively in series with the phototransistor supply voltage across capacitor 83. In a typical example, this supply voltage across capacitor 83 might be, for example, 11.5 volts, while the negative peaks might be 3 to 5 volts. If the rectifier 84 has a zener breakdown voltage of about 13 to 15 volts, the addition of the negative peaks and the transistor supply voltage will raise the voltage across rectifier 84 above its zener value, so that the back resistance of rectifier 84 will drop sharply, effectively short circuiting the charge on capacitor 83 to ground through the forward resistance of rectifier 75. This action discharges capacitor 83 faster than it can charge through resistor 77 and thus lowers the phototransistor supply voltage. The lowering of the supply voltage to phototransistor 56 results in a decrease in the gain thereof, the decrease in gain being a function of the magnitude of the negative peaks delivered by rectifier 75 and hence of the degree of turbulence. It should be remembered, of course, that such lowered gain only occurs during a period of turbulence in the protected space.

With the gain of the phototransistor lowered, higher frequencies of the order of the reed frequency resulting from air turbulence will be materially reduced in amplitude in the phototransistor output, and hence will not be sufficiently strong to cut off thyratron 42 and produce an alarm. Although this arrangement reduces the response of the system to motion in the protected space when ordinary turbulence is present, when such motion is that of an intruder or the extreme turbulence of a fire, the strength of the reed frequency components caused thereby will be sufficiently great to cut off thyratron 42 and produce an alarm. An intruder or a fire will result in a much greater percentage of reed frequencies than lower frequencies.

It will be recalled that the filament of the lamp 37 which illuminates the phototransistor 56 is supplied with power through front contact 34 of relay 32. Thus when relay 32 drops out so that motor 17 is energized to vary capacitor 14 and hence to vary the transmitted frequency, lamp 37 will be extinguished. With the lamp 37 out, the reed filter circuit will be inoperative, so that beat frequencies, which may result from reverberation caused by the simultaneous presence in the protected space of a plurality of transmitted frequencies, cannot cause an alarm to be transmitted.

If the light source for the reed filter should fail by burning out of the filament of lamp 37, the supervisory potential supplied to the thyratron control grid through conductor 43 would be cut off as soon as capacitor 41 had time to discharge. This would result in transmission of an alarm.

Should the oscillator tube 10, the amplifier tube 15 or the amplifier tube 22 fail, the resulting absence of the carrier frequency in the output of tube 22 would cause relay 32 to drop out and transmit an alarm after the usual delay caused by the discharge time of capacitor 41. The same result would obtain upon failure of amplifier tube 25 or of the power supply rectifier tube. In order to supervise completely the tube complement, triodes 46 and 44 may be included in the same tubes (as double triodes) with triodes 10 and 15, respectively, so that if either tube fails, relay 32 will drop out and an alarm will be given.

Referring now to Fig. 3, there is illustrated a reed type filter constructed in accordance with the invention. The filter unit is mounted on a base 85 having an upstanding wall 86 at one end thereof. The base 85 and wall 86 may be formed as an integral piece from a sheet of non-magnetic material such as brass. At the opposite end of the base 85 there is provided another upstanding wall which may be formed from a magnetic material such as steel. Between the walls 86 and 87 the base 85 carries a strong permanent magnet 88, which may be poled as shown. A horizontally extending flange 89 extending outwardly from the wall 87 holds the magnet 88 in place. A pair of parallel rods 90 and 91 extend between and are supported in the walls 86 and 87. The rods 90 and 91 are preferably made from a non-magnetic material such as brass.

A block 92 is provided with holes adapted to accommodate the rods 90 and 91 which support the block 92 above the magnet 88 at an intermediate point between the walls 86 and 87. The location of the block 92 may be adjusted by loosening a set screw 93, sliding the block 92 along the rods 90 and 91, and then tightening the set screw 93. An upper portion 94 of the block 92 is formed as a separate piece and is affixed to the main part of the block 92 by screws 95. The block 92, including the portion 94, is preferably formed from a non-magnetic material such as brass.

The vibrating reed of the filter is a thin metal strip 96, which should be made from a magnetic material and might be a .010 inch thick spring steel strip. The reed 96 is firmly clamped between the portions of the block 92. The non-vibrating end of the reed 96 is held against the top of the wall 87 by a flange portion 97 of a bracket 98. Screws 99 hold the flange 97 and the strip 96 firmly in contact with the wall 87. The free or vibrating end 100 of the reed 96 extends over the end of the wall 86 and is disposed between a lamp 101 and a phototransistor 102 (which correspond to the lamp 37 and phototransistor 56, respectively, of Fig. 1). The lamp 101 and phototransistor 102 are supported by a bracket 103 carried on the wall 86.

The bracket 98, which may be made of a magnetic material such as steel, has a horizontal portion 104 disposed above and parallel to the reed 96. Adjacent the end of the portion 104 there is mounted a vertical steel or iron rod 105 which extends downwardly to a point just above the reed 96. The gap between the rod 105 and the reed 96 might be, for example, 1/16 inch. The rod 105 may be laminated, if desired, as is often done with magnetic cores. The rod 105 carries a coil 106 which corresponds to the coil 54 of Fig. 1. The current which is to vibrate the reed 96 is passed through the coil 106.

In operation, light from source 101 impinges on the emitter of phototransistor 102 which causes carrier currents to be formed in the base region, thereby increasing collector current flow. The reed, which vibrates at double the frequency of the current flowing through the coil 106, acts as a shutter, causing sharp pulses of collector current. These sharp pulses of collector current will develop a substantial voltage across a load inductor, e.g., the coil 57 of Fig. 1. The frequency of these pulses will be double the driving frequency supplied to the coil 106.

The effective length of the reed 96 should be adjusted, by moving the block 92, until the natural resonant frequency thereof coincides with the frequency to which the filter is to be tuned, e.g., 35 cycles per second. The light beam between the source 101 and the phototransistor should preferably pass as close to the end 100 of the reed 96 as possible, because at this end the amplitude of reed vibration will be maximum. Similarly, the driving coil 106 should be located near the end 100 of the reed 96 since its effect in producing reed vibration will then be maximized.

The magnetic flux from magnet 88 acting through a path including walls 86 and 87 and reed 96, serves to dampen the free end of the reed by attraction thereof toward bracket 103. This serves to prevent spurious signals in the phototransistor circuit due to physical vibration and aids in suppressing motion of the reed at coil frequencies other than the natural resonant frequency of the reed.

An important advantage of the reed type filter of the invention lies in the high Q which can be realized. This is due to the fact that the amplitude of reed vibrations will drop off sharply at frequencies different from the natural vibratory frequency of the reed. Another important advantage is that stray coupling between the driving coil and the phototransistor is prevented, thereby suppressing transfer of frequencies off the resonant frequency of the reed through circuit capacities and the like.

While the invention has been described in a particular embodiment thereof and in a particular use, various modifications thereof will occur to those skilled in the art without departing from the spirit and scope of the invention as set forth in the appended claims. For example, while the invention has been described in connection with sound energy, and particularly in connection with ultrasonic sound energy, the principles of the invention are applicable to a motion detection system employing other types of radiant energy, such as the high frequency electromagnetic radiations of the type disclosed in Lindsay et al. Patent 2,247,246 granted June 24, 1941. Furthermore, while the invention is particularly applicable to detecting motion in an enclosed space such as a room, it will be found useful in detecting motion in non-enclosed areas.

What is claimed is:

1. In a motion detection system of the type in which a first alternating current is converted into radiant energy which is transmitted throughout a space to be protected and in which a portion of the radiant energy within the space is received and converted into a second alternating current, modulation components in the second alternating current representing motion within the protected space, relatively low frequency modulation components being characteristic of ordinary air turbulence and higher frequency modulation components lying within a given range being characteristic of motion of a type to be detected, the combination comprising an oscillator for generating said first alternating current, said oscillator having a frequency determining variable impedance element for varying the generated frequency over a selected range, means responsive to a drop in the amplitude of said second alternating current below a predetermined value to vary the value of said variable impedance element thereby to vary the frequency of said first alternating current through said selected range until a frequency is reached at which the amplitude of said second alternating current reaches said predetermined value, means operative a predetermined time interval after the amplitude of said second alternating current drops below said predetermined value to transmit an alarm indication, said last mentioned means being rendered inoperative if the amplitude of said second alternating current reaches said predetermined value within said predetermined time interval, a high Q filter circuit tuned to a frequency within said given range, means to derive from said second alternating current a third alternating current having frequencies corresponding to the frequencies of modulation components in said second alternating current, means to apply said third alternating current to said filter circuit, means to amplify the output of said filter circuit, means responsive to an amplified output of said filter circuit in excess of a selected value to transmit an alarm indication, and means responsive to said relatively low frequencies characteristic of air turbulence when present in said third alternating current to reduce the amplification of said output of said filter circuit.

2. In a motion detection system of the type in which a first alternating current is converted into radiant energy which is transmitted throughout a space to be protected and in which a portion of the radiant energy within the space is received and converted into a second alternating current, modulation components in the second alternating current representing motion within the protected space, relatively low frequency modulation components being characteristic of ordinary air turbulence and higher frequency modulation components lying within a given range being characteristic of motion of a type to be detected, the combination comprising an oscillator for generating said first alternating current, said oscillator having a frequency determining variable impedance element for varying the generated frequency over a selected range, means responsive to a drop in the amplitude of said second alternating current below a predetermined value to vary the value of said variable impedance element thereby to vary the frequency of said first alternating current through said selected range until a frequency is reached at which the amplitude of said second alternating current reaches said predetermined value, means operative a predetermined time interval after the amplitude of said second alternating current drops below said predetermined value to transmit an alarm indication, said last mentioned means being rendered inoperative if the amplitude of said second alternating current reaches said predetermined value within said predetermined time interval, means to derive from said second alternating current a third alternating current having frequencies corresponding to the frequencies of modulation components in said second alternating current, a high Q filter circuit tuned to a frequency within said given range, said filter circuit including a source of light, a phototransistor arranged in the path of said light, a reed element interposed in the path of said light between said source and said phototransistor and a coil arranged to cause said reed element to vibrate, means to apply said third alternating current to said coil, means responsive to the output of said phototransistor when in excess of a selected value to transmit an alarm indication, and means responsive to said relatively low frequencies characteristic of air turbulence when present in said third alternating current to reduce the gain of said phototransistor.

3. In a motion detection system of the type in which a first alternating current is converted into radiant energy which is transmitted throughout a space to be protected and in which a portion of the radiant energy within the space is received and converted into a second alternating current, modulation components in the second alternating current representing motion within the protected space and being used to provide an alarm indication, the combination comprising an oscillator for generating said first alternating current, said oscillator having a frequency determining variable impedance element for varying the generated frequency over a selected range, mechanical means for varying the value of said variable impedance element, means responsive to a drop in the amplitude of said second alternating current below a predetermined value to actuate said mechanical means to vary the value of said variable impedance element thereby to vary the frequency of said first alternating current through said selected range until a frequency is reached at which the amplitude of said second alternating current reaches said predetermined value, and means operative a predetermined time interval after the amplitude of said second alternating current drops below said predetermined value to transmit an alarm indication, said last mentioned means being rendered inoperative if the amplitude of said second alternating current reaches said predetermined value within said predetermined time interval.

4. In a motion detection system of the type in which a first alternating currnet is converted into radiant energy which is transmited throughout a space to be protected and in which a portion of the radiant energy within the space is received and converted into a second alternating current, modulation components in the second alternating current representing motion within the protected space and being used, where present in sufficient strength, to provide an alarm indication, the combination comprising an oscillator for generating said first alternating current, said oscillator having a frequency determining variable impedance element for varying the generated frequency over a selected range, means including an electric motor mechanically coupled to said variable impedance element and having an energizing circuit arranged to be energized in response to a drop in the amplitude of said second alternating current below a predetermined value to vary the value of said variable impedance element thereby to vary the frequency of said first alternating currnet through said selected range until a frequency is reached at which the amplitude of said second alternating current reaches said predetermined value, and means operative a predetermined time interval after the amplitude of said second alternating current drops below said predetermined value to transmit an alarm indication, said last mentioned means being rendered inoperative if the amplitude of said second alternating current reaches said predetermined value within said predetermined time interval.

5. In a motion detection system of the type in which a first alternating current is converted into radiant energy which is transmitted throughout a space to be protected and in which a portion of the radiant energy within the space is received and converted into a second alternating current modulation components in the second alternating current, representing motion within the protected space and being used to provide an alarm indication under predetermined conditions, the combination comprising an oscillator for generating said first alternating current, said oscillator having a variable impedance element for varying the generated frequency over a selected range, an electric motor mechanically coupled to said variable impedance element, an energizing circuit for said electric motor, means to complete said energizing circuit, said last mentioned means being operative to complete said energizing circuit only while the amplitude of said second alternating current is below a predetermined value thereby to vary the value of said variable impedance element and to vary the frequency of said first alternating current through said selected range until a frequency is reached at which the amplitude of said second alternating current reaches said predetermined value, and means operative a predetermined time interval after the amplitude of said second alternating currnet drops below said predetermined value to transmit an alarm indication, said last mentioned means being rendered inoperative if the amplitude of said second alternating current reaches said predetermined value within said predetermined time interval.

6. In a motion detection system of the type in which a first alternating current is converted into radiant energy which is transmitted throughout a space to be protected and in which a portion of the radiant energy within the space is received and converted into a second alternating current, modulation components in the second alternating current representing motion within the protected space and being used to provide an alarm indication under predetermined conditions, the combination comprising an oscillator for generating said first alternating current, said oscillator having a variable impedance element for varying the generated frequency over a selected range, means to rectify a portion of said second alternating current, a relay arranged to be energized by the rectified second alternating current while the latter exceeds a predetermined value, an electric motor having an energizing circuit including an armature and back contact of said relay whereby said electric motor is energized when said relay becomes de-energized, said electric motor being mechanically coupled to said variable impedance element to vary the value of said variable impedance element when said motor is energized thereby to vary the frequency of said first alternating current through said selected range until a frequency is reached at which the amplitude of said rectified second alternating current exceeds said predetermined value, and means operative a predetermined time interval after the amplitude of said rectified second alternating current fails to exceed said predetermined value to transmit an alarm indication, said last mentioned means being rendered inoperative if the amplitude of said rectified second alternating current exceeds said predetermined value within said predetermined time interval.

7. In a motion detection system of the type in which a first alternating current is converted into radiant energy which is transmitted throughout a space to be protected and in which a portion of the radiant energy within the space is received and converted into a second alternating current, modulation components in the second alternating current representing motion within the protected space and being used to provide an alarm indication under predetermined conditions, the combination comprising an oscillator for generating said first alternating current, said oscillator having a variable impedance element for varying the generated frequency over a selected range, means responsive to a drop in the amplitude of said second alternating current below a predetermined value to vary the value of said variable impedance element thereby to vary the frequency of said first alternating current through said selected range until a frequency is reached at which the amplitude of said second alternating current reaches said predetermined value, a capacitor normally charged to a particular value but arranged to be discharged when the amplitude or said second alternating current falls below said predetermined value and means operative when the charge on said capacitor drops to a selected level to transmit an alarm indication, said last mentioned means being rendered inoperative by recharging of said capacitor if the amplitude of said second alternating current reaches said predetermined value before the charge on said capacitor drops to said selected level.

8. In a motion detection system of the type in which a first alternating current is converted into radiant energy which is transmitted throughout a space to be protected and in which a portion of the radiant energy within the space is received and converted into a second alternating current, modulation components in the second alternating current representing motion within the protected space and being used to provide an alarm indication under predetermined conditions, the combination comprising an oscillator for generating said first alternating current, said oscillator having a variable impedance element for varying the generated frequency over a selected range, means to rectify a portion of said second alternating current, a relay arranged to be energized by the rectified second alternating current while the latter exceeds a predetermined value, an electric motor having an energizing circuit including an armature and back contact of said relay whereby said electric motor is energized when said relay becomes de-energized, said electric motor being mechanically coupled to said variable impedance element to vary the value of said variable impedance element when said motor is energized thereby to vary the frequency of said first alternating current through said selected range until a frequency is reached at which the amplitude of said second rectified alternating current exceeds said predetermined value, a capacitor having a normally completed charging circuit including an armature and a front contact of said relay, a discharging circuit for said capacitor having a time constant such that discharge of said capacitor to a predetermined level occurs in a predetermined time interval after de-energization of said relay, and means operative when the charge on said capacitor drops to said predetermined level to transmit an alarm indication, energization of said relay before the end of said predetermined time interval preventing the charge on said capacitor from reaching said predetermined level.

9. A motion detection system as set forth in claim 8 in which there is provided a normally conducting discharge tube de-energization of which results in said transmission of an alarm, the charge on said capacitor being applied to an electrode of said tube as a bias voltage serving to maintain said tube in conductive condition, said bias voltage being insufficient to maintain said tube in conductive condition when the charge on said capacitor drops to said predetermined level.

10. A motion detection system as set forth in claim 9 in which said discharge tube is of the gaseous discharge type and in which a D.C. voltage derived from modulation components in said second alternating current is applied to an electrode of said tube in a sense to cause said tube to cease conduction.

11. A motion detection system as set forth in claim 6 in which said variable impedance element is a variable capacitor connected so as to vary the frequency to which the frequency determining circuit of said oscillator is tuned.

12. A motion detection system as set forth in claim 6 in which said radiant energy is of the ultrasonic type and has a frequency of the order of 20,000 cycles per second, the range through which the frequency of said radiant energy may be varied by variation in the impedance value of said variable impedance element being of the order of 200 cycles per second.

13. In a motion detection system of the type in which a first alternating current is converted into radiant energy which is transmitted throughout a space to be protected and in which a portion of the radiant energy within the space is received and converted into a second alternating current, modulation components in the second alternating current representing motion within the protected space, relatively low frequency modulation components being characteristic of ordinary air turbulence and higher frequency modulation components lying within a given range being characteristic of motion of a type to be detected, the combination comprising means to derive from said second alternating current a third alternating current having frequencies corresponding to the frequencies of modulation components in said second alternating current, a filter circuit tuned to a frequency within said given range, means to apply said third alternating current to said filter circuit, means to amplify the output of said filter circuit, means responsive to an amplified output of said filter circuit in excess of a selected value to transmit an alarm indication, and means responsive to said relatively low frequencies characteristic of air turbulence when present in said third alternating current to reduce the amplification of said output of said filter circuit.

14. In a motion detection system of the type in which a first alternating current is converted into radiant energy which is transmitted throughout a space to be protected and in which a portion of the radiant energy within the space is received and converted into a second alternating current, modulation components in the second alternating current representing motion within the protected space, relatively low frequency modulation components being characteristic of ordinary air turbulence and higher frequency modulation components lying within a given range being characteristic of motion of a type to be detected, the combination comprising means to derive from said second alternating current a third alternating current having frequencies corresponding to the frequencies of modulation components in said second alternating current, a filter circuit tuned to a frequency within said given range, means to apply said third alternating current to said filter circuit, means to amplify the output of said filter circuit, means responsive to an amplified output of said filter circuit in excess of a selected value to transmit an alarm indication, and means responsive to said relatively low frequencies characteristic of air turbulence when present in said third alternating current to reduce the amplification of said output of said filter circuit, the amount of reduction in said amplification being a function of the degree of air turbulence.

15. In a motion detection system of the type in which a first alternating current is converted into radiant energy which is transmitted throughout a space to be protected and in which a portion of the radiant energy within the space is received and converted into a second alternating current, modulation components in the second alternating current representing motion within the protected space, relatively low frequency modulation components being characteristic of ordinary air turbulence and higher frequency modulation components lying within a given range being characteristic of motion of a type to be detected, the combination comprising means to derive from said second alternating current a third alternating current having frequencies corresponding to the frequencies of modulation components in said second alternating current, a high Q filter circuit, said filter circuit comprising a vibratable element having a natural period of vibration corresponding to a frequency within said given range, a phototransistor, a source of illumination for said phototransistor located so that said vibratable element is interposed in the path of light between said source and said phototransistor and a coil arranged so as to produce vibration of said element in response to an alternating current passed therethrough, means to apply said third alternating current to said coil, means responsive to an output of said phototransistor in excess of a selected value to transmit an alarm indication, and means responsive to said relatively low frequencies characteristic of air turbulence when present in said third alternating current to reduce the amplification of said output of said filter circuit produced by said phototransistor.

16. In a motion detection system of the type in which a first alternating current is converted into radiant energy which is transmitted throughout a space to be protected and in which a portion of the radiant energy within the space is received and converted into a second alternating current, modulation components in the second alternating current representing motion within the protected space, relatively low frequency modulation components being characteristic of ordinary air turbulence and higher frequency modulation components lying within a given range being characteristic of motion of a type to be detected, the combination comprising means to derive from said second alternating current a third alternating current having frequencies corresponding to the frequencies of modulation components in said second alternating current, a high Q filter circuit, said filter circuit comprising a source of illumination, a phototransistor, a vibratable reed having a free end thereof interposed in the path of light between said source and said phototransistor whereby vibration of said reed will modulate the output of said phototransistor and a driving coil arranged so as to produce vibration of said reed when an alternating current is passed through said coil, said reed having a natural period of vibration corresponding to a frequency in said given range, means to apply said third alternating current to said coil and means responsive to an output of said phototransistor in excess of a selected value to transmit an alarm indication.

17. In a motion detection system of the type in which a first alternating current is converted into radiant energy which is transmitted throughout a space to be protected and in which a portion of the radiant energy within the space is received and converted into a second alternating current, modulation components in the second alternating current representing motion within the protected space, relatively low frequency modulation components being characteristic of ordinary air turbulence and higher frequency modulation components lying within a given range being characteristic of motion of a type to be detected, the combination comprising means to derive from said second alternating current a third alternating current having frequencies corresponding to the frequencies of modulation components in said second alternating current, a high Q filter circuit, said filter circuit comprising a source of allumination, a phototransistor, a vibratable reed having a free end thereof interposed in the path of light between said source and said phototransistor whereby vibration of said reed will modulate the output of said phototransistor and a driving coil arranged so as to produce vibration of said reed when an alternating current is passed through said coil, said reed having a natural period of vibration corresponding to a frequency in said given range, means to apply said third alternating current to said coil, means responsive to an output of said phototransistor in excess of a selected value to transmit an alarm indication, and means responsive to said relatively low frequencies characteristic of air turbulence when present in said third alternating current to reduce the gain of said phototransistor by an amount which varies with the degree of air turbulence in said protected space.

18. A motion detection system of the type set forth in claim 17 in which an inductive element is coupled to the output electrodes of the phototransducer, the output voltage of said phototransducer being developed across said inductive element.

19. A motion detection system as set forth in claim 18 in which there is provided a normally conductive gaseous discharge tube de-energization of which produces said transmission of an alarm, an amplifier circuit arranged to amplify the phototransistor output voltage developed across said inductive element, and a rectifier arranged to rectify the output of said amplifier circuit and to apply the resulting D.C. voltage to an electrode of said gaseous discharge tube in a sense to cause the latter to cease conduction.

20. In a motion detection system of the type in which a first alternating current is converted into radiant energy which is transmitted throughout a space to be protected and in which a portion of the radiant energy within the space is received and converted into a second alternating current, modulation components in the second alternating current representing motion within the protected space, relatively low frequency modulation components being characteristic of ordinary air turbulence and higher frequency modulattion components lying within a given range being characteristic of motion of a type to be detected, the combination comprising means to derive from said second alternating current a third alternating current having frequencies corresponding to the frequencies of modulation components in said second alternating current, a filter circuit tuned to a frequency within said given range, means to apply said third alternating current to said filter circuit, means to amplify the output of said filter circuit, means responsive to an amplified output of said filter circuit in excess of a selected value to transmit an alarm indication, and means responsive to said relatively low frequencies characteristic of air turbulence when present in said third alternating current to reduce the amplification of said output of said filter circuit, said last mentioned means including a second filter circuit constructed so as to reject frequencies above those characteristic of ordinary air turbulence, means to apply said third alternating current to said second filter circuit, means to derive from the output of said second filter circuit a voltage proportional to the air turbulence in said protected space and means to reduce the operating potentials of said amplifying means when said voltage exceeds a given level.

21. In a motion detection system of the type in which a first alternating current is converted into radiant energy which is transmitted throughout a space to be protected and in which a portion of the radiant energy within the space is received and converted into a second alternating current, modulation components in the second alternating current representing motion within the protected space, relatively low frequency modulation components being characteristic of ordinary air turbulence and higher frequency modulation components lying within a given range being characteristic of motion of a type to be detected, the combination comprising means to derive from said second alternating current a third alternating current having frequencies corresponding to the frequencies of modulation components in said second alternating current, a high Q filter circuit, said filter circuit comprising a source of illumination, a phototransistor, a vibratable reed having a free end thereof interposed in the path of light between said source and said phototransistor whereby vibration of said reed will modulate the output of said phototransistor and a driving coil arranged so as to produce vibration of said reed when an alternating current is passed through said coil, said reed having a natural period of vibration corresponding to a frequency in said given range, means to apply said third alternating current to said coil, means responsive to an output of said phototransistor in excess of a selected value to transmit an alarm indication, and means responsive to said relatively low frequencies characteristic of air turbulence when present in said third alternating current to reduce the gain of said phototransistor, said last mentioned means including a second filter circuit constructed so as to reject frequencies above those characteristic of ordinary air turbulence, means to apply said third alternating current to said second filter circuit, means to derive from the output of said second filter circuit a voltage proportional to the air turbulence in said protected space, a source of operating potential for said phototransistor, a rectifier element coupled between said source of operating potential and ground potential and poled so as to maintain said operating potentials above ground potential and means to apply said voltage to said rectifier element in a sense to cause the total voltage thereacross to exceed the zener breakdown voltage of said rectifier element whereby the operating potentials for said phototransistor are reduced, in turn reducing the gain of said phototransistor.

22. A motion detection system, as set forth in claim 21, in which said phototransistor operating potential is developed across a capacitive element arranged to be discharged through the back resistance of said rectifier element when the zener breakdown voltage across said rectifier element is exceeded.

23. A motion detection system as set forth in claim 22 in which the voltage across said capacitive element and said voltage proportional to air turbulence are poled in additive sense with respect to said rectifier element.

24. A motion detection system as set forth in claim 23 in which said rectifier element is a silicon junction diode having a zener breakdown voltage approximately equal to the sum of the voltage across the capacitive element and the voltage proportional to air turbulence corresponding to the minimum air turbulence for which a decrease in phototransistor gain is desired.

References Cited in the file of this patent

UNITED STATES PATENTS

| | | |
|---|---|---|
| 2,163,195 | Edwards | June 20, 1939 |
| 2,749,537 | Loudon et al. | June 5, 1956 |
| 2,769,972 | MacDonald | Nov. 6, 1956 |
| 2,777,999 | Hathaway | Jan. 15, 1957 |
| 2,794,974 | Bagno et al. | June 4, 1957 |
| 2,810,888 | George et al. | Oct. 22, 1957 |
| 2,810,889 | Lundgren | Oct. 22, 1957 |

UNITED STATES PATENT OFFICE

CERTIFICATE OF CORRECTION

Patent No. 2,972,133                          February 14, 1961

Leslie A. MacDonald

It is hereby certified that error appears in the above numbered patent requiring correction and that the said Letters Patent should read as corrected below.

Column 1, line 31, for "than" read -- that --; column 4, line 59, after "transducer" insert a period; column 11, lines 45, and 63, for "currnet", each occurrence, read -- current --; line 46, for "transmited" read -- transmitted --; column 12, line 4, after "current" insert a comma; line 5, after "current" strike out the comma; column 15, line 24, and column 16, line 20, for "modulattion", each occurrence, read -- modulation --; column 15, line 54, for "allumination" read -- illumination --.

Signed and sealed this 5th day of September 1961.

(SEAL)
Attest:

ERNEST W. SWIDER
Attesting Officer

DAVID L. LADD
Commissioner of Patents
USCOMM-DC